United States Patent [19]

Sangu

[11] Patent Number: 5,265,171
[45] Date of Patent: Nov. 23, 1993

[54] OPTICAL CHARACTER READING APPARATUS FOR PERFORMING SPELLING CHECK

[75] Inventor: Akio Sangu, Tokyo, Japan

[73] Assignee: Kabushiki Kaisha Toshiba, Kawasaki, Japan

[21] Appl. No.: 799,305

[22] Filed: Nov. 27, 1991

[30] Foreign Application Priority Data

Nov. 28, 1990 [JP] Japan .................... 2-328462

[51] Int. Cl.⁵ .................................. G06K 9/34
[52] U.S. Cl. ................................ 382/9; 382/48; 382/57
[58] Field of Search ............ 382/9, 57, 48, 16; 364/419, 225.6

[56] References Cited

U.S. PATENT DOCUMENTS

| | | | |
|---|---|---|---|
| 3,969,700 | 7/1976 | Bollinger | 382/9 |
| 4,611,346 | 9/1986 | Bednar et al. | 382/9 |
| 4,654,873 | 3/1987 | Fujisawa et al. | 382/9 |
| 4,860,376 | 8/1989 | Tanaka et al. | 382/9 |
| 4,901,063 | 2/1990 | Kimura et al. | 382/57 |
| 4,907,283 | 3/1990 | Tanaka et al. | 382/57 |
| 4,907,285 | 3/1990 | Nakano et al. | 382/61 |
| 4,933,979 | 6/1990 | Suzuki et al. | 382/61 |
| 4,933,984 | 6/1990 | Nakano et al. | 382/48 |
| 4,985,863 | 1/1991 | Fujisawa et al. | 382/57 |
| 5,033,098 | 7/1991 | Tanaka et al. | 382/9 |
| 5,123,062 | 6/1992 | Sangu | 382/57 |

OTHER PUBLICATIONS

Toshiba Review (vol. 44, No. 1); pp. 41–44; S. Ariyoshi, A. Okazaki and H. Asada: "Application of Pattern Processing Technique To Document Processing".

Primary Examiner—Joseph Mancuso
Attorney, Agent, or Firm—Oblon, Spivak, McClelland, Maier & Neustadt

[57] ABSTRACT

In an optical character reading apparatus for optically reading characters recorded on a paper sheet, when a character string divided based on an interval of characters in a document includes a hyphen, a character string to be spelling-checked is generated according to the position of a hyphen. When the hyphen is present at the beginning of the next line. When the hyphen is not present at the end of line, the hyphen is deleted to divide the character string into a plurality of character strings.

8 Claims, 6 Drawing Sheets

OPTICAL CHARACTER READING APPARATUS FOR PERFORMING SPELLING CHECK

BACKGROUND OF THE INVENTION

1. Field of the Invention

The present invention relates to an optical character reading apparatus for reading characters of general documents such as English texts, and checking the spelling of the read documents.

2. Description of the Related Art

In recent years, an optical character reading apparatus (OCR) for reading characters of general documents such as English texts has been developed, and is beginning to be put into practical applications. In such an OCR, the format of a document to be read is not limited, and a variety of documents can be read.

The OCR has a function of checking character recognition results in units of words so as to confirm and correct the reading results. In the OCR having the spelling checking function, it is important to correctly segment words to be checked from the character recognition results so as to improve accuracy.

In general, words are segmented on the basis of physical divisions or boundaries between words recorded on a paper sheet. More specifically, a space between words is checked, and if a space equal to or larger than a predetermined value is found, it is determined as a division of words. In a general English document, however, an original division of words is often different from a division of words printed on a paper sheet.

For example, a word generated by connecting a plurality of independent words by hyphens (to be referred to as a compound word hereinafter) is segmented as one word. A word, which is divided to be located at the end of a line and at the beginning of the next line for the printing convenience since it is located at a line end position of a paper sheet (to be referred to as a separated word), is segmented as two words (in general, the separated word is recorded so that a hyphen is added to a character string (a portion of a word) at the line end position).

Such compound words and separated words are not registered in a dictionary prepared in advance for the spelling checking function. Words included in a compound word are originally those which are to be spelling-checked independently. In a separated word, character strings different from an original word are spelling-checked. Therefore, compound words and separated words cannot be correctly spelling-checked.

In order to solve this problem, all words including compound words and separated words may be registered in a dictionary. However, since the number of words becomes huge in this case, a very large capacity for storing a dictionary is required. For this reason, this method is not practical.

In this manner, a conventional OCR cannot correctly segment compound words or separated words as words to be spelling-checked. For this reason, even when the spelling checking function is executed, the character recognition results cannot be reliably confirmed and corrected.

SUMMARY OF THE INVENTION

It is an object of the present invention to provide an optical character reading apparatus, which can correctly segment words to be spelling-checked, and can reliably confirm and correct character recognition results.

According to the present invention, there is provided an optical character reading apparatus for optically reading characters recorded on a paper sheet, comprising: a character detection unit for detecting image data in units of characters recorded on the paper sheet from paper sheet image data obtained by optically scanning the paper sheet; a recognition unit for executing character recognition processing of the image data detected by the character detection unit so as to recognize characters recorded on the paper sheet; a detection unit for detecting character strings to be spelling-checked from the character recognition results obtained by the recognition unit; and a spelling checking unit for checking spelling of the character strings detected by the detection unit.

According to the present invention, there is provided a spelling checking method in an optical character reading apparatus for optically reading characters recorded on a paper sheet, comprising the steps of: detecting image data in units of characters recorded on the paper sheet from paper sheet image data obtained by optically scanning the paper sheet; executing character recognition processing of the image data detected in the step of detecting the image data so as to recognize characters recorded on the paper sheet; detecting character strings to be spelling-checked from the character recognition results obtained in the step of recognizing the characters; and checking spelling of the character strings detected in the step of detcting the character strings.

In the optical character reading apparatus of the present invention, when character strings divided on the basis of intervals between characters include a hyphen, character strings to be spelling-checked are generated according to the position of the hyphen. When the hyphen is present at the end of a line, a character string from which the hyphen is deleted is combined with a character string at the beginning of the next line. When the hyphen is not present at the end of a line, the hyphen is deleted from a character string including it to divide the character string into a plurality of character strings. Therefore, separated words and compound words can be reliably spelling-checked.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
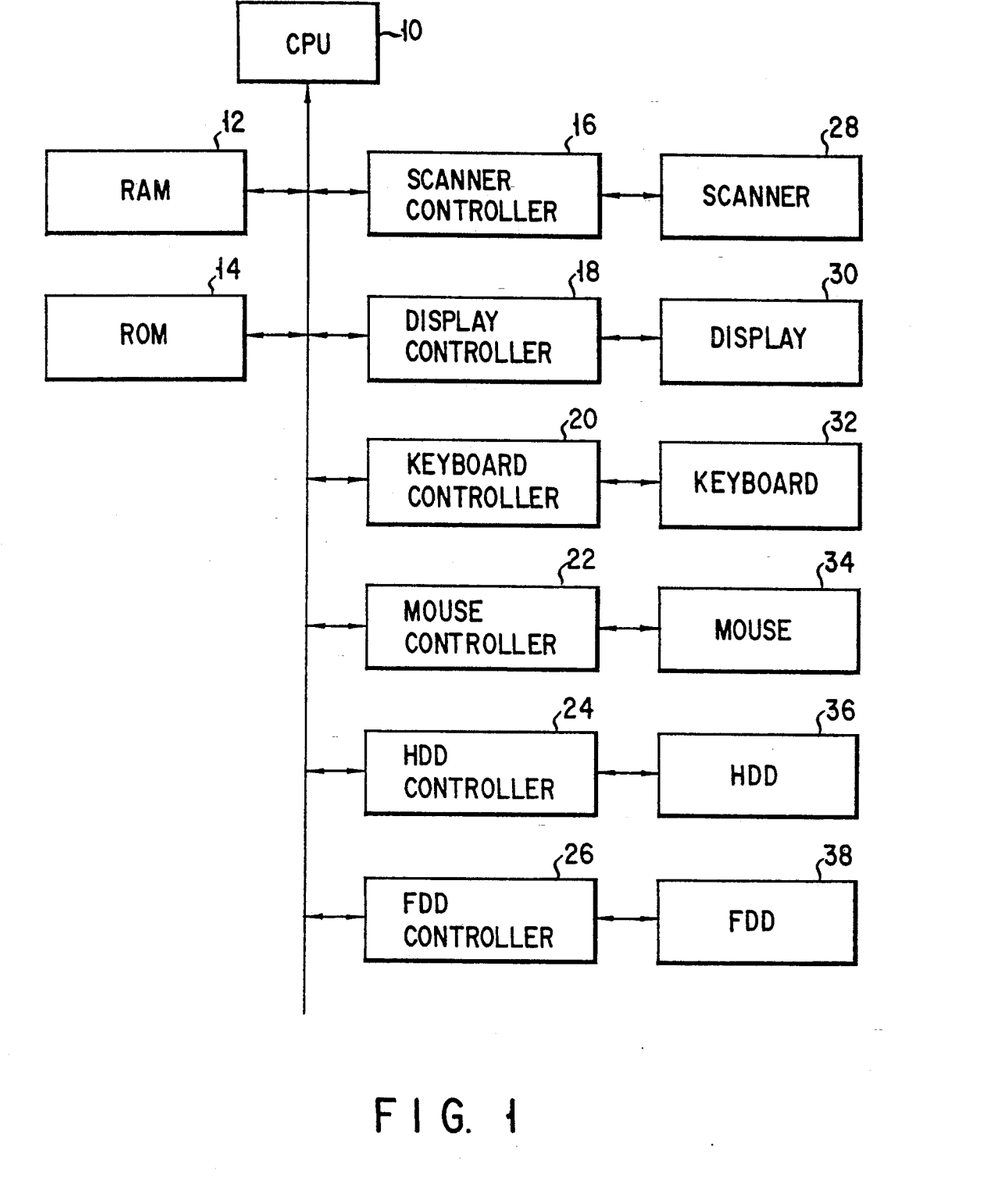
FIG. 1 is a block diagram showing an arrangement of an optical character reading apparatus according to an embodiment of the present invention.

An embodiment of the present invention will be described below with reference to the accompanying drawings. FIG. 1 is a block diagram showing an arrangement of an optical character reading apparatus (OCR) according to the present invention. In FIG. 1, a CPU 10 controls the overall apparatus according to various processing programs. The CPU 10 is connected to a RAM 12, a ROM 14, a scanner controller 16, a display controller 18, a keyboard controller 20, a mouse controller 22, an HDD (hard disk drive) controller 24, and an FDD (floppy disk drive) controller 26.

A scanner 28 is connected to the scanner controller 16. A display 30 is connected to the display controller 18. A keyboard 32 is connected to the keyboard controller 20. A mouse 34 is connected to the mouse controller 22. An HDD 36 is connected to the HDD controller 24. An FDD 38 is connected to the FDD controller 26.

The scanner 28 optically scans a document to be processed using, e.g., a CCD (charge coupled device) under the control of the scanner controller 16 so as to detect image data on the document. The image data detected by the scanner 28 is stored in the RAM 12. The display 30 displays character recognition results, a document layout, and the like under the control of the display controller 18. The keyboard 32 and the mouse 34 are used by a user to input instructions to the OCR. The HDD 36 and the FDD 38 store programs, data, and the like.

The ROM 14 stores various programs including an image processing program, a character recognition processing program, and a word processing program, and dictionary data (a character recognition dictionary and a word dictionary). These programs and dictionary data may be stored in an HD (hard disk) or an FD (floppy disk), may be read out by the HDD 36 or FDD 38, as needed, and may be stored in the RAM 12.

The image processing program detects a document size, and a region to be subjected to character reading processing (document block) where characters are recorded in a document, extracts lines included in the document block, and segments character patterns from each line in units of characters.

The character recognition processing program performs character recognition processing of the segmented character patterns in units of characters while looking up the character recognition dictionary, thus obtaining character recognition results (character codes).

The word processing program segments words on the basis of the character recognition processing results, segmented character positions, and the like, and checks the spelling of the segmented words by looking up the preset word dictionary.

Figure 2:
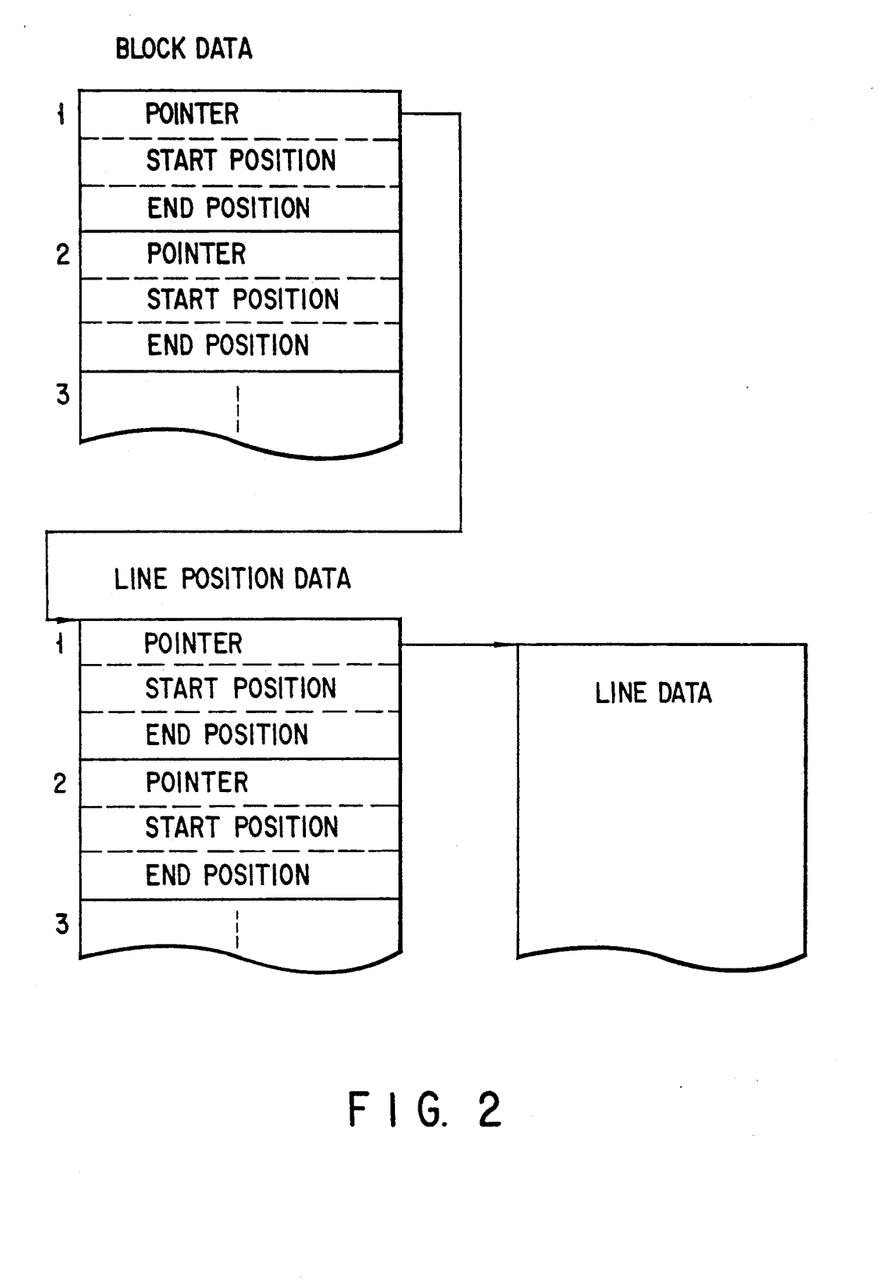
FIG. 2 is a view for explaining data obtained by image processing.

The RAM 12 stores data obtained by the image processing, the character recognition processing, and the word processing. FIG. 2 shows a data architecture showing the relationship between block data (coordinates) of a document block obtained by the image processing, and line position data (coordinates) of lines in the document block.

The block data is constituted by position data (coordinates of start and end positions) of each document block, and a pointer indicating line position data in lines of the document block. The line position data is constituted by position data (coordinates of start and end positions) of each line in the document block, and a pointer indicating detailed line data (see FIG. 6) associated with this line.

Figure 3:
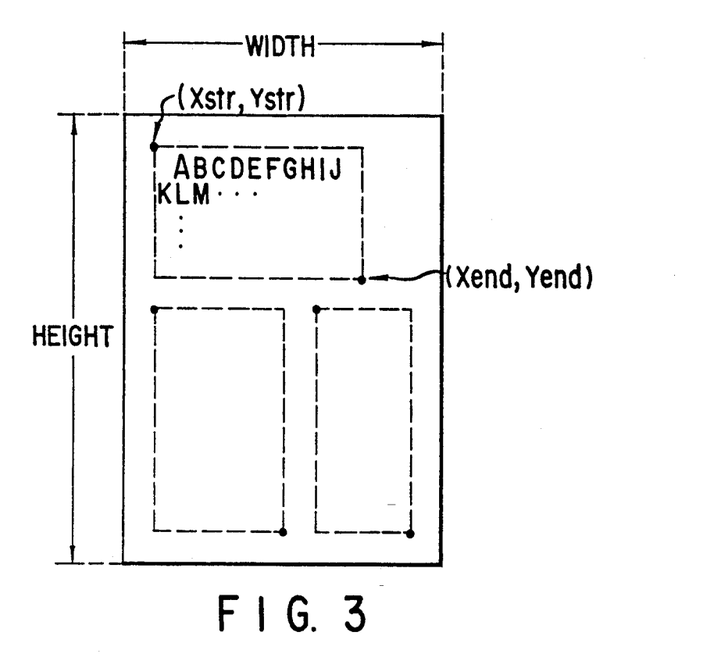
FIG. 3 is a view showing an example of a document layout.

A document to be processed will be described below. A document to be processed has a layout as shown in FIG. 3. The document shown in FIG. 3 is a general English document whose format is not specified, and data associated with a character size, a character input position, and the like are not prepared in advance in the apparatus. Assume that three document blocks are formed on this document, as indicated by broken line frames in FIG. 3, and character strings are recorded in these document blocks. Not all the character strings are illustrated in the document blocks in FIG. 3.

Figure 4:
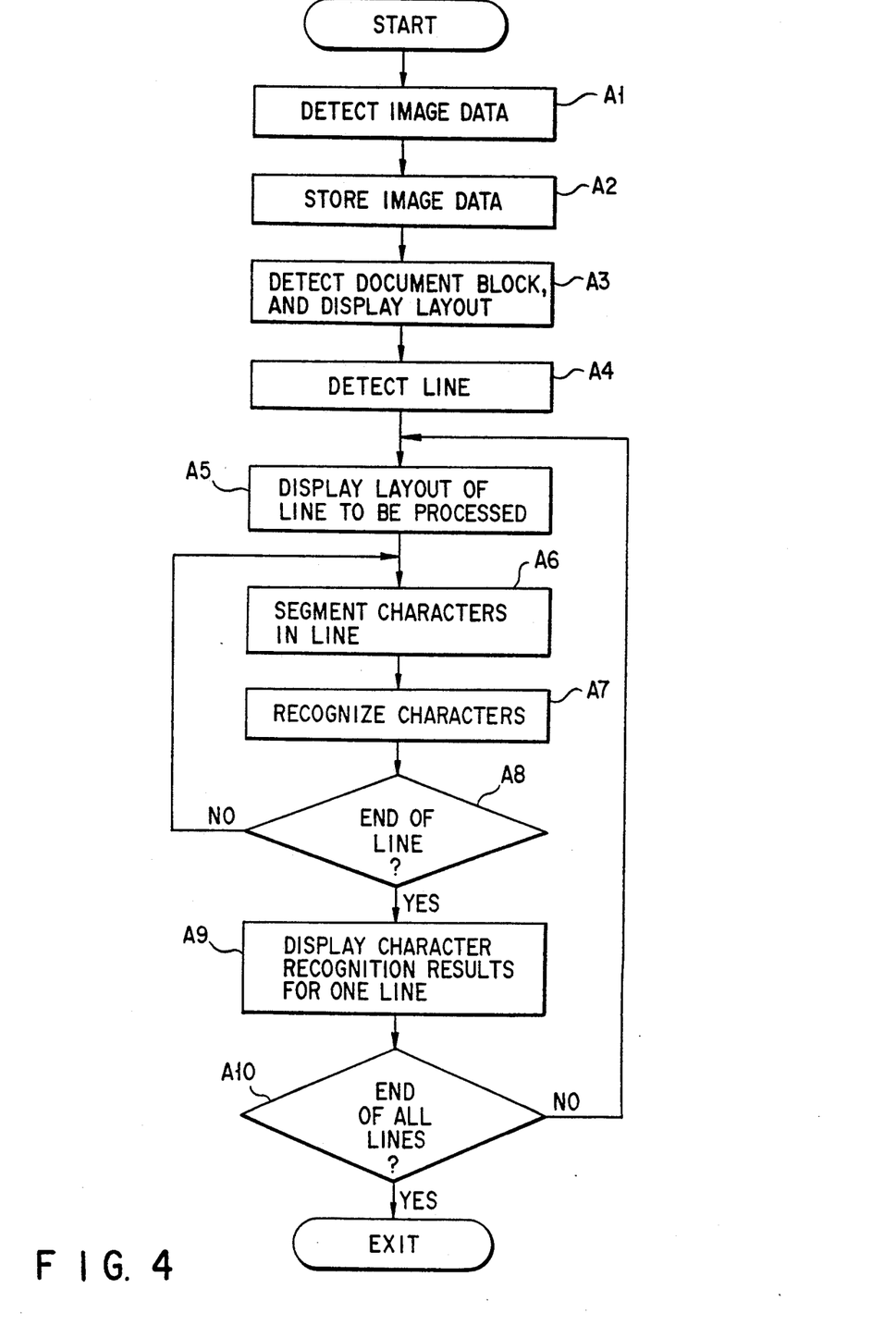
FIG. 4 is a flow chart for explaining an operation until character recognition results are obtained.

The image processing and character recognition processing will be described below with reference to the flow chart shown in FIG. 4. The CPU 10 starts the image processing program to start the image processing. The scanner 28 optically scans a document shown in FIG. 3 to detect image data (step A1). The CPU 10 stores the image data detected by the scanner 28 in the RAM 12 (step A2). The scanner 28 reads an image at a resolution of, e.g., 300 dpi (12 dot/mm).

When image data for one document is stored in the RAM 12, the CPU 10 starts layout analysis of the document. The CPU 10 detects a document size, document blocks, positions of lines in the document blocks, and character positions on the basis of the image data, as will be described below.

The CPU 10 detects the document size (width and height) on the basis of the image data of the document stored in the RAM 12. The CPU 10 projects the image data for one document in the X-axis direction (parallel to a lateral character line), and in the Y-axis direction perpendicular to the X-axis, thereby obtaining line positions in the document, and character positions in the lines.

Furthermore, the CPU 10 obtains, as a document block, a portion having a line interval equal to or larger than that for one line, and a character interval equal to or larger than a predetermined value at the same column positions over a plurality of lines. The document block position, line positions, and character positions (to be referred to as layout data hereinafter) are represented by the coordinates of two diagonal points of a rectangle.

As for the document shown in FIG. 3, the CPU 10 stores the coordinates (Xstr, Ystr) of the upper left point (start point) of a rectangular frame indicated by a broken line frame in FIG. 3, and the coordinates (Xend, Yend) of the lower right point (end point) in the RAM 12. If there are a plurality of document blocks, as shown in FIG. 3, the CPU 10 stores coordinates representing the positions of the document blocks in the RAM 12.

The CPU 10 instructs the display controller 18 to display a layout of document blocks. The display controller 18 causes the display 30 to display the layout on the basis of the document size and the document block positions stored in the RAM 12 (step A3).

Figure 5:
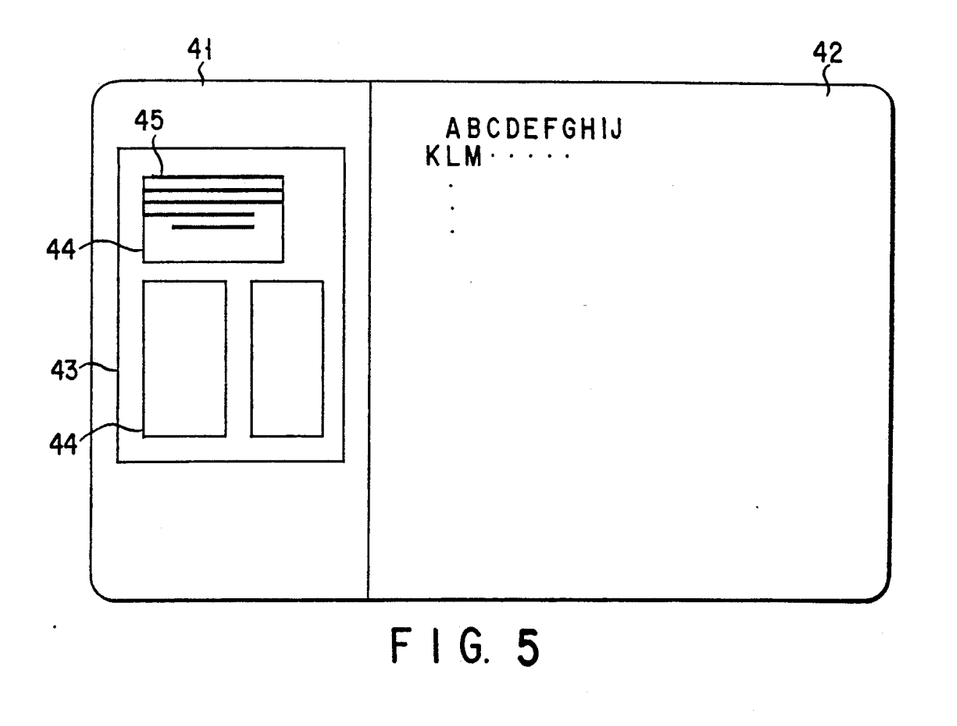
FIG. 5 is a view showing an example of a layout display.

A display screen on the display 30 has a layout shown in, e.g., FIG. 5. More specifically, a left portion of the screen corresponds to a layout display area 41 for displaying the layout of document blocks, and a right portion corresponds to a character recognition result display area 42 for displaying character recognition results. The display controller 18 determines a document frame 43 indicating a document size, document block frames 44 indicating document blocks, and positions for displaying these frames according to the size of the layout display area 41 on the basis of the document size and the document block positions stored in the RAM 12.

The display 30 displays the document frame 43 and the document block frames 44 under the control of the display controller 18.

The CPU 10 projects image data in each document block stored in the RAM 12 to obtain line positions (coordinates of start and end points) of lines in the document block, and stores the obtained line positions in the RAM 12 in correspondence with the document block, as shown in FIG. 2 (step A4).

The CPU 10 instructs the display controller 18 to display a layout of lines to be processed. The display controller 18 determines a line pattern and size to be displayed within the corresponding document block frame 44 in the layout display area 41 on the basis of the coordinates representing the line position stored in the RAM 12. The display 30 displays a line pattern 45 indicating the line position of a line to be processed within the document block frame 44 (step A5). Note that the line to be processed starts from the first line of the firs document block.

Upon completion of layout analysis by the image processing, and the display of the line pattern to be processed, the CPU 10 starts the character recognition processing program to start the character recognition processing. The CPU 10 segments data for one character (character pattern) from image data of the line to be processed stored in the RAM 12 on the basis of the layout data obtained by the image processing (step A6). The CPU 10 recognizes the character pattern by looking up the character recognition dictionary stored in the ROM 14, thus generating a character code (1-byte code) (step A7).

Figure 6:
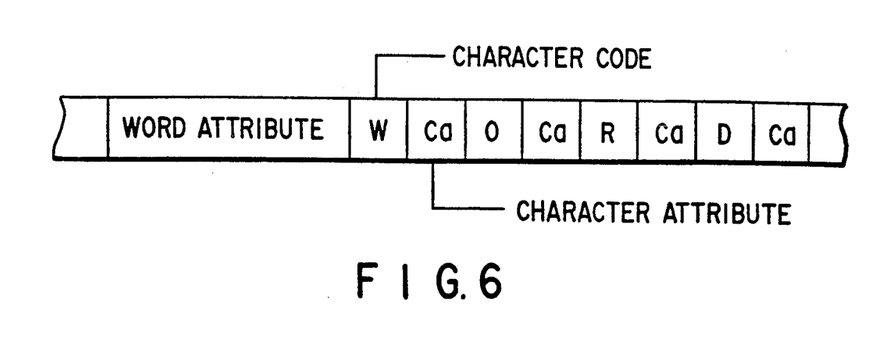
FIG. 6 is a view for explaining data obtained by character recognition processing.

In this case, when two character positions have an interval exceeding a predetermined value therebetween, the CPU 10 determines a division of words. As a result of the character recognition processing, data shown in FIG. 6 is stored in the RAM 12.

More specifically, the CPU 10 adds a character attribute (e.g., 1 byte) to the character recognition result (character code), and stores them in the RAM 12. The character attribute includes a similarity value to the dictionary obtained upon character recognition, and a suspicious flag indicating accuracy or reliability of the character recognition result according to, e.g., the relationship between the similarity value and a similarity value of a second candidate character.

The CPU 10 adds a word attribute (e.g., 4 bytes) before the character recognition result (a character string "WORD" in FIG. 6), which is determined as a division of words, and stores them in the RAM 12. The word attribute includes a font of characters in a word, a character size, character positions (coordinates), the presence/absence of an underline, the presence/absence of reversal, designation of a superscript or subscript mode, and a suspicious flag indicating reliability of a word.

Note that the suspicious flag in the word attribute is set according to the suspicious flags of characters included in a word. When a word includes a reject character (for which a character recognition result cannot be obtained by the character recognition processing), and a character added with the suspicious flag (indicating an error since the character has a low similarity value in the character recognition processing), the suspicious flag in the word attribute is set to be a value indicating an error.

Upon completion of character recognition for character patterns for one line (step A8), the CPU 10 transfers the character codes for one line to the display controller 18, and instructs it to display the character recognition results (step A9).

The display controller 18 generates display patterns for one line according to the character codes for one line. The display 30 displays the display patterns for one line on the character recognition result display area 42 under the control of the display controller 18.

If there is a line, which is not recognized, in the document block, the character recognition processing for the next line is performed, as described above (step A10). If recognition for all the lines in the document block is completed, the character recognition processing for the next document block is executed.

Figure 7:
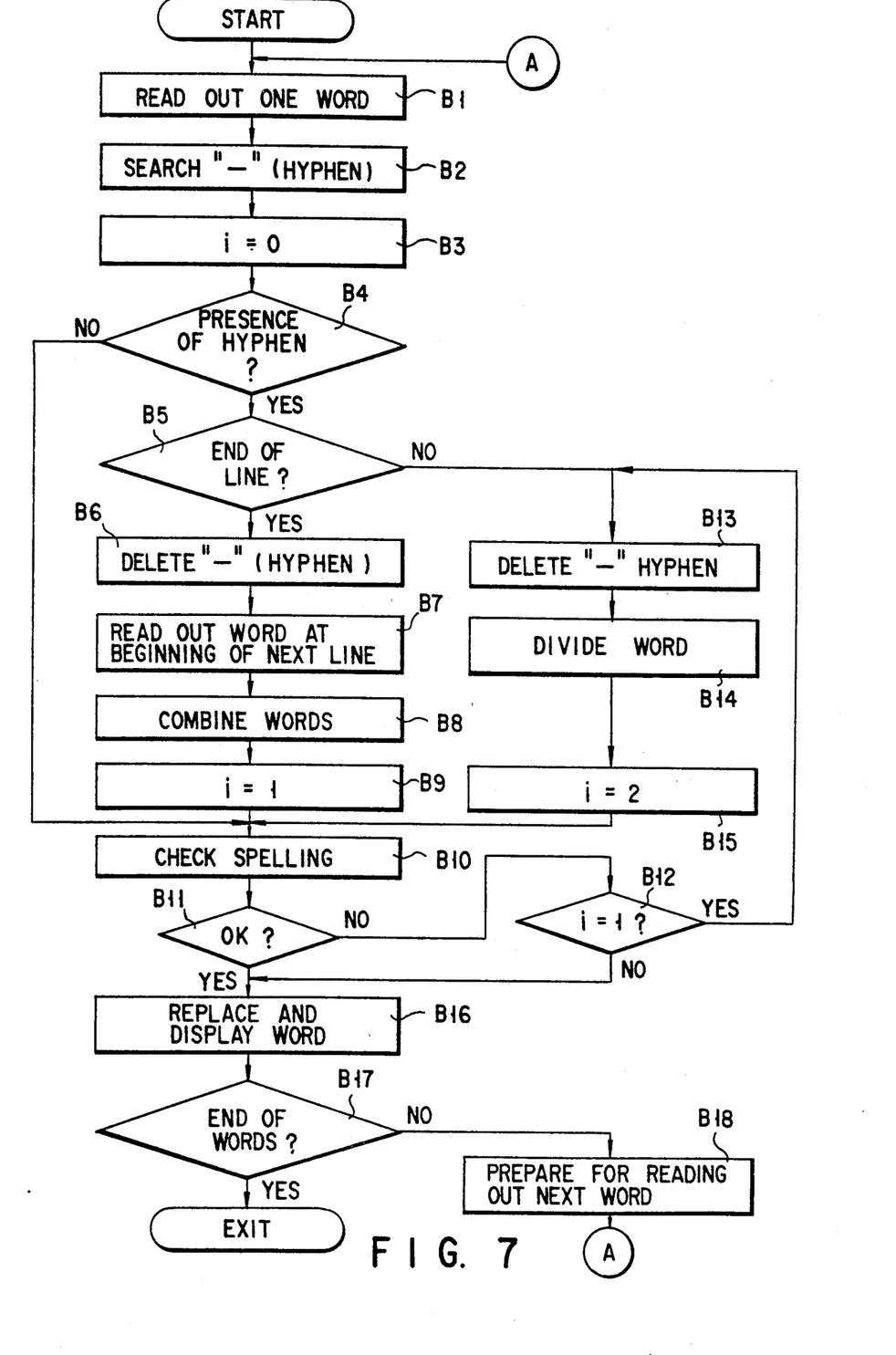
FIG. 7 is a flow chart for explaining a word processing operation.

The word processing will be described below with reference to the flow chart shown in FIG. 7. Upon completion of the character recognition processing of characters in the document blocks, the CPU 10 starts the word processing program to start the word processing (spelling checking processing).

Figure 8:
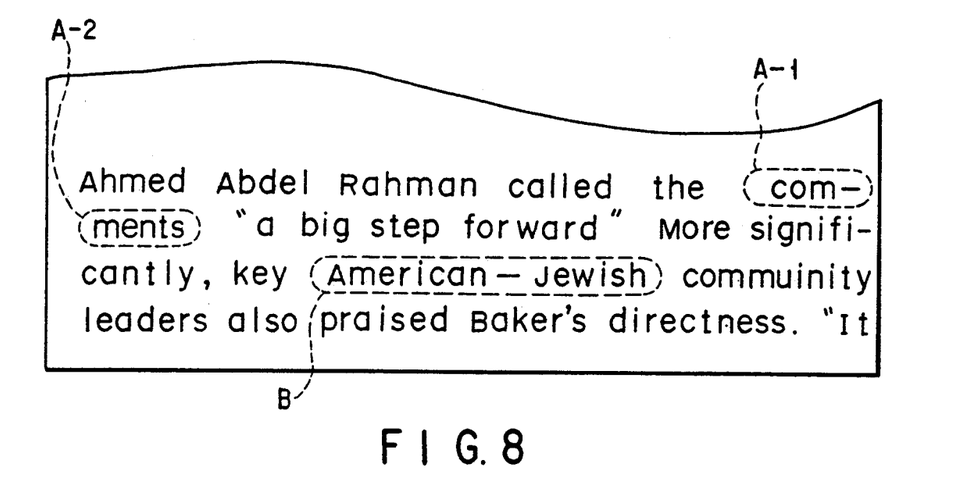
FIG. 8 is a view showing an example of a document.
Figure 9:
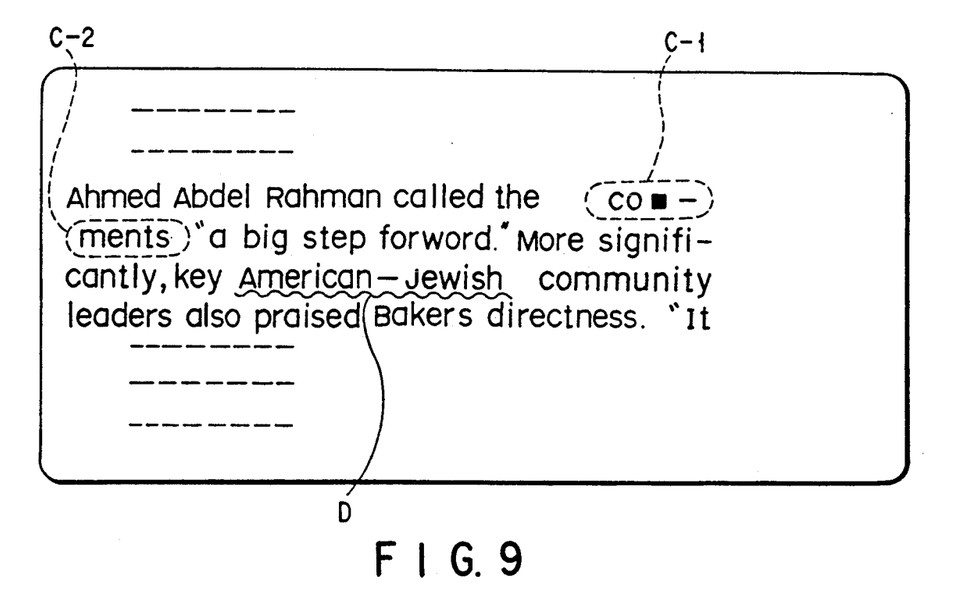
FIG. 9 is a view showing a display example of character recognition results.

Assume that character strings shown in FIG. 8 are recorded on a given document block. As a result of the character recognition processing of this document block, the character recognition results shown in FIG. 9 are displayed on the character recognition result display area 42 on the display 30.

The CPU 10 reads out the character recognition results (character code string) for one word from the RAM 12 (step B1). The character recognition results for one word are divided based on a character interval in a line. The CPU 10 searches a character code representing a hyphen "-" from the character code string for one word (step B2). CPU 10 sets parameter i to "0" (step B3).

In a general English document, a compound word is generated by connecting a plurality of words by hyphens. A word at the end of a line is separated into two character strings due to a limited paper size, thus generating a separated word. In a separated word, one character string added with a hyphen is present at the end of a line, and the other character string is present at the beginning of the next line. The spelling checking processing is performed for original words obtained by deleting hyphens from such compound words and separated words.

When the hyphen "-" is present in a character code string for one word, the CPU 10 determines the character code string as a compound word or as one character code string of a separated word. The CPU 10 checks based on the character position in the word attribute added to the word including the hyphen, and line data indicating the line position including this word whether or not the word is present at the end of the line (step B5).

If it is determined that the word is present at the end of the line, and the hyphen is present at the end of the character string, the CPU 10 determines that this character code string is one character string of the separated word. The CPU 10 deletes the hyphen from this character string (step B6). Furthermore, the CPU 10 reads out the character codes of a word (character string) at the beginning of the next line from the RAM 12 (step B7), and combines them with the previously input character string at the end of the line, thus generating one word (step B8). The CPU 10 sets parameter i to "1" (step B9). The CPU 10 checks the spelling of the word generated by combining the two character strings by looking up the word dictionary (step B10).

In FIG. 8, a word "com-ments" indicated by A-1 and A-2 is an example of the separated word. The character string "com-" at the end of a line does not form a correct word, and is obtained by separating an original word into two character strings due to the limitation of the paper size, and adding a hyphen "-" to the end of one character string. This separated word is subjected to processing in steps B6 to B8 to generate a correct word "comments" from which the hyphen "-" is deleted, and the word "comments" is subjected to the spelling checking processing.

When an error is detected by the spelling check proceccing, CPU 10 checks parameter i (step B12). When parameter i is "1", CPU 10 determines that the word at the end of current line is one word of the compound word having a plurality of words, e.g., two words. Since the compound word includes a hyphen, CPU 10 deletes the hyphen (step B13), and then divides the compound word into one word at the of the current line and the other word at the beginning of the next line (step B14). CPU 10 sets parameter i to "2" (step B15). CPU 10 performs the spelling check for the one word and the other word (step B10).

If it is determined in step B5 that the word position is not the end of the line, the CPU 10 determines that the character string including the hyphen is a compound word. The CPU 10 deletes the hyphen from the compound word (step B13) to divide the compound word into a plurality of words (step B14). CPU 10 sets parameter i to "2" (step B15).

In the case of a compound word, the CPU 10 checks the spelling of a plurality of words obtained by dividing the compound word (step B10).

A word ("American-Jewish") indicated by B in FIG. 8 is an example of the compound word. A hyphen "-" is deleted from this compound word to divide it into two words "American" and "Jewish" in steps B9 and B10. These words are then spelling-checked.

If it is determined in step B4 that no hyphen "-" is present in the character code string for one word, the CPU 10 determines a general word, and checks the spelling of the word (step B10).

When an error is found by the spelling checking processing, i.e., when a reject character or a character which cannot be correctly recognized is present in the character recognition results (step B11), the characters can be corrected using the spelling check results.

More specifically, the CPU 10 obtains candidate words similar to the word including a reject character or erroneous character in the spelling checking processing, and displays them on the character recognition result display area 42 on the display 30. In this case, the CPU 10 reads out image data of a word as a processing object from the RAM 12, transfers it to the display controller 18, and displays character patterns detected by the scanner 28.

The CPU 10 then urges a user to select a correct word from word candidates using the keyboard 32 or the mouse 34. The CPU 10 replaces the word including the reject character or erroneous character with a word selected by the user, and displays the selected word (step B16).

If a separated word indicated by C-1 and C-2 including a reject character (indicated ■ FIG. 9) is present, as shown in FIG. 9, the reject character is replaced with a correct character. If a compound word indicated by D is present, the CPU 10 displays candidates of compound words as combinations of word candidates of the divided words on the character recognition result display area 42 on the display 30. The CPU 10 then urges a user to select a correct word from the word candidates using the keyboard 32 or the mouse 34.

If the spelling checking processing of all the words is not completed (step B17), the CPU 10 prepares for reading out the character recognition results (character code string) of a word to be processed next from the RAM 12 (step B18).

The CPU 10 reads out the character recognition results (character code string) for one word to be processed next from the RAM 12 (step B1). Thereafter, the CPU 10 executes the spelling checking processing, as described above.

In the above embodiment, the spelling checking processing of all the words is sequentially performed. Candidate words are displayed for a word including a reject character or erroneous character, and a correct word is properly selected to replace a wrong character. However, words may be selectively designated to execute the spelling checking processing. For example, after the character recognition processing, the CPU 10 may display words, in which the suspicious flags in the word attributes indicate errors, in a state different from other words, so that a user can easily distinguish these words from other words. For example, the display controller 18 causes the display 30 to display these words by reversing them or in a specific color. The CPU 10 executes processing in steps B1 to B11 in FIG. 7 for words arbitrarily selected from all the words.

As described above, spelling checking processing of compound words and separated words including hyphens in character recognition results can be executed using original words. Therefore, the character recognition results can be reliably corrected.

The embodiment of the present invention has been exemplified. However, the present invention is not limited to the above embodiment, and various changes and modifications may be made within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is

1. An optical character reading apparatus for optically reading characters recorded on a paper sheet, comprising:

character detection means for detecting image data in units of characters recorded on the paper sheet from paper sheet image data obtained by optically scanning the paper sheet;

recognition means for executing character recognition processing of the image data detected by said character detection means so as to recognize characters recorded on the paper sheet;

extraction means for extracting a first character string from character recognition results obtained by said recognition means on the basis of an interval of characters recorded on the paper sheet;

search means for searching for a hyphen from the first character string extracted by said extraction means;

detection means for detecting a position of the hyphen searched by said search means;

combining means for, when the hyphen is present at the end of line, deleting the hyphen and combining the first character string from which the hyphen is deleted, and a character string at the beginning of a line next to the line to generate a second character string to be spelling-checked;

dividing means for, when the hyphen is not present at the end of a line, deleting the hyphen to generate a plurality of third character strings to be spelling-checked; and spelling checking means for checking spelling for the second and third character strings.

2. An apparatus according to claim 1, wherein when the character string obtained by the combining means is error by the spelling check, the spelling check is performed for the first character string from which the hyphen is deleted, and a character string at the beginning of a line next to the line.

3. An optical character reading apparatus for optically reading characters recorded on a paper sheet, comprising:

character detection means for detecting image data in units of characters recorded on the paper sheet from paper sheet image data obtained by optically scanning the paper sheet;

recognition means for executing character recognition processing of the image data detected by said character detection means so as to recognize characters recorded on the paper sheet;

extraction means for extracting a character string from the character recognition results on the basis of an interval of characters recorded on the paper sheet;

search means for searching for a hyphen from the character string extracted by said extraction means;

generation means for generating a character string to be spelling-checked according to the character string in which the hyphen is detected by said search means; and spelling checking means for checking spelling of the character strings generated by said generation means.

4. An apparatus according to claim 3, wherein said generation means includes:

discrimination means for discriminating a position of the hyphen in the character string;

combining means for, when said discrimination means discriminates that the hyphen is present at the end of a line, combining the character string from which the hyphen is deleted, and a character string at the beginning of a next line; and dividing means for, when said discrimination means discriminates that the hyphen is not present at the end of a line, deleting the hyphen to divide the character string into a plurality of character strings.

5. An apparatus according to claim 3, further comprising replacing means for replacing a character string in units of character strings generated by said generation means on the basis of results from said spelling checking means.

6. A spelling checking method in an optical character reading apparatus for optically reading characters recorded on a paper sheet, comprising the steps of:

detecting image data in units of characters recorded on the paper sheet from paper sheet image data obtained by optically scanning the paper sheet;

executing character recognition processing of the image data detected in the step of detecting the image data so as to recognize the characters recorded on the paper sheet;

extracting a character string from the character recognition results on the basis of an interval of characters recorded on the paper sheet;

searching for a hyphen from the character string extracted in the step of extracting the character string from the character recognition results;

generating a character string to be spelled-checked according to the character string in which the hyphen is detected in the step of searching the hyphen from the character string; and checking spelling of the character string generated in the step of generating the character string.

7. A method according to claim 6, wherein the step of generating the character string to be spelling-checked includes the steps of:

discriminating a position of the hyphen in the character string;

combining the character string from which the hyphen is deleted, and a character string at the beginning of a next line when it is discriminated in the step of discriminating the position of the hyphen that the hyphen is present at the end of a line; and deleting the hyphen to divide the character string into a plurality of character strings when it is discriminated in the step of discriminating the position of the hyphen that the hyphen is not present at the end of a line.

8. A method according to claim 6, further comprising the step of replacing a character string in units of character strings generated in the step of generating the character string to be spelling-checked on the basis of results in the step of checking the spelling.

* * * * *